United States Patent Office 3,310,553
Patented Mar. 21, 1967

3,310,553
ALKYLATED THIOXANTHENESULFONAMIDES
Barry M. Bloom, Lyme, and James F. Muren, Niantic, Conn., assignors to Chas. Pfizer & Co., Inc., New York, N.Y., a corporation of Delaware
No Drawing. Filed Apr. 26, 1963, Ser. No. 276,081
5 Claims. (Cl. 260—240)

This invention is concerned with new and useful chemical compounds. More specifically, it is concerned with substituted thioxanthenesulfonamides, and with the acid addition salt derivatives thereof; these compounds are valuable as psychotherapeutic agents and as intermediates in the production of such agents.

The present application is a continuation-in-part of the earlier filed patent application, Ser. No. 226,144, filed on Sept. 25, 1962, by Barry M. Bloom and James F. Muren, now abandoned.

The new compounds contemplated by the present invention are selected from the group consisting of those of the formula:

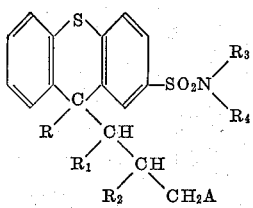

and the acid-addition salts thereof, wherein:

R is hydrogen or, when taken together with $R_1$, forms a single bond;

$R_1$ is selected from the group consisting of hydrogen and lower alkyl or, when taken together with R forms a single bond;

$R_2$ is selected from the group consisting of hydrogen and lower alkyl;

$R_3$ and $R_4$ when taken separately are selected from the group consisting of hydrogen and lower alkyl, and $R_3$ and $R_4$ when taken together with the nitrogen atom to which they are attached form a cyclic member selected from the group consisting of pyrrolidino, piperidino, morpholino and 4-lower alkylpiperazino; and A is selected from the group consisting of dialkylamino, 4-alkylpiperazinyl, 4-hydroxyalkylpiperazinyl, 4-acyloxyalkylpiperazinyl, 4-carbamylalkylpiperazinyl, 4-monoalkylcarbamylalkylpiperazinyl, 4 - dialkylcarbamylalkylpiperazinyl, 4-alkoxyalkylpiperazinyl, 4-aryloxyalkylpiperazinyl, 4-hydroxyalkyloxyalkylpiperazinyl, 4-acylalkylpiperazinyl, 4-aroylalkylpiperazinyl, 4-carboalkoxypiperazinyl, 4-carbamylpiperazinyl, 4-monoalkylcarbamylpiperazinyl, 4-dialkylcarbamylpiperazinyl, 4-acylpiperazinyl, 4-aroylpiperazinyl, 4-alkylsulfonylpiperazinyl and 4-dialkylsulfamylpiperazinyl, said alkyl and acyl groups containing up to about 4 carbon atoms.

The compounds of this invention are valuable for the chemotherapy of mental disease and especially for the treatment of excited states. They have potent antiemetic properties.

Particularly valuable for this purpose are compounds of the following formula:

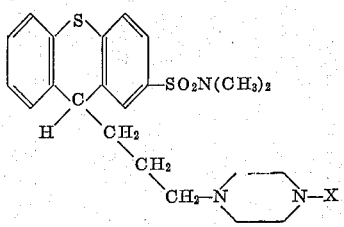

wherein X is selected from the group consisting of methyl, 2-hydroxyethyl, 3-hydroxypropyl, dimethylsulfonamido and methylsulfonyl.

Other especially valuable compounds for this purpose are those represented by the following formula:

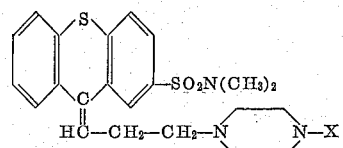

wherein X is as hereinbefore defined.

The instant invention also contemplates compounds of the following formula:

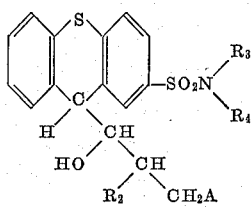

wherein $R_2$, $R_3$, $R_4$ and A have the meanings hereinbefore defined. These new compounds are useful as intermediates in the preparation of the valuable biologically-active compounds of the instant invention.

Also contemplated by the present invention are compounds of the formula:

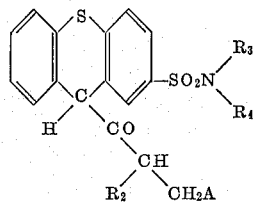

wherein $R_2$, $R_3$, $R_4$ and A have the meanings hereinbefore defined. These new compounds are useful as intermediates in the preparation of the valuable compounds of the instant invention.

Furthermore, the instant invention contemplates compounds of the formula:

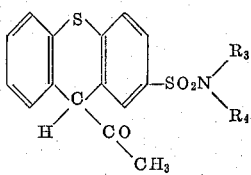

wherein $R_3$ and $R_4$ have the meanings hereinbefore defined. These new compounds are useful as intermediates in the preparation of the valuable compounds of the instant invention.

The compounds of the present invention may be prepared by a number of procedures. One especially convenient procedure is outlined in the following reaction sequence:

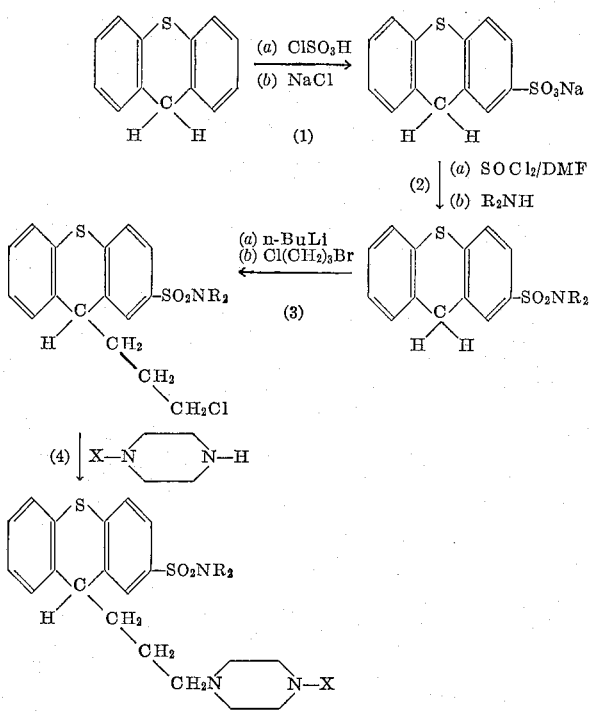

wherein X is as hereinbefore defined, and DMF refers to dimethylformamide.

In step (1) of this scheme, conversion of the readily-available thioxanthene to sodium thioxanthene-2-sulfonate, the reaction is carried out in a stepwise manner by successive treatment of thioxanthene with chlorosulfonic acid then with sodium chloride. For example, thioxanthene is dissolved in about 5 parts by weight of chloroform and, after cooling to about 0° C., is treated with at least about an equimolar amount, preferably about 1.2 moles per mole, of chlorosulfonic acid; this reagent is preferably added as rapidly as possible while maintaining the mixture temperature below 10° C. The reaction mixture is then allowed to warm to about 25° C. and the reaction is brought to completion by refluxing for an additional half hour. The sulfonic acid derivative is converted to its crystalline sodium salt by pouring the cooled mixture into about half of its weight of crushed ice then treating the mixture with an amount of sodium chloride equivalent to from about 0.6 to about 1 part by weight of the thioxanthene originally taken. The crystalline product is isolated by filtration. It can be purified by washing with a small amount of chloroform then can be recrystallized from about 50 parts by weight of boiling water.

With respect to step (2), the conversion of sodium thioxanthene-2-sulfonate to 2-sulfamylthioxanthene, the reaction can be carried out in a stepwise fashion first by converting the sulfonate group to the corresponding chlorosulfonyl group, then transforming this group to the sulfamyl group by reaction with ammonia, a primary, or a secondary amine. For example, the crystalline sodium thioxanthene-2-sulfonate can be dissolved in from about 1 to about 3 parts by weight of N,N-dimethylformamide and to this can be added, portionwise, at least about one mole, and preferably, a 10% molar excess of thionyl chloride. The reaction mixture usually becomes homogeneous after several minutes then can be treated with about three parts by weight of crushed ice; the product which usually precipitates as a gum can be caused to crystallize after a short period of stirring. The crystalline sulfonyl chloride can be then removed by filtration and can be converted to the sulfamyl derivative by treatment with at least about 2 and preferably about 10 molar equivalents of amine, based on the starting sodium salt. The excess amine can be removed by distillation in a vacuum and the residue can be triturated with about three volumes of water. The product can be recovered by filtration and is dried in vacuo. The product can be further purified by crystallization from an appropriate solvent; especially convenient is a mixture of ethanol and chloroform (1:1).

With respect to step (3), the conversion of 2-dimethylsulfamylthioxanthene to 9-(3-chloropropyl)-2-dimethylsulfamylthioxanthene, the reaction can be carried out in a stepwise manner involving first treatment with n-butyl lithium, then treatment of the organolithium intermediate formed thereby with at least about 1 molar equivalent of 1-chloro-3-bromopropane. This reagent reacts preferentially at its bromine atom. For example, a well-stirred suspension of 2-dimethylsulfamylthioxanthene in about 8 parts by weight of dimethoxyethane can be cooled to about 5° C. and can be treated in a nitrogen atmosphere with at least about an equimolar amount of n-butyl lithium; for convenience in handling, it is preferred to add the butyl lithium as a 3 M solution in purified heptane. The addition of the alkyl lithium reagent is preferably carried out at such a rate that the reaction temperature can be maintained below about 10° C. The reaction mixture can be then siphoned dropwise by means of nitrogen pressure into a reaction flask containing 1-chloro-3-bromopropane in an amount equivalent to about 5 moles per mole of 2-dimethylsulfamylthioxanthene originally taken. The reaction can be brought to completion by allowing the mixture to stand at 25° C. for about one hour followed by heating to refluxing for 30 minutes. The solvents can be removed by vacuum distillation; two portions of dimethylformamide can be added during the distillation to aid in the complete removal of any unreacted 1-chloro-3-bromopropane. The product, which remains as a residue after distillation, is sufficiently pure at this stage to be converted to the aminoalkyl substituted compounds of the instant invention.

With respect to step (4), the conversion of the 9-chloropropylthioxanthene to the corresponding 9-aminopropylthioxanthene, the reaction can be carried out by treatment of the chloropropyl compound with an appropriate amine. For example, the crude chloropropylthioxanthene can be dissolved in from about two to about 10 parts by weight of an inert solvent such as methyl ethyl ketone and then can be treated with at least about 2 molar equivalents of appropriate amine. The reaction mixture can then be heated to refluxing and stirred for 15 hours, and then after cooling, the solvent can be evaporated. The product, which remains as a residual oil after distillation, can be dissolved in a solvent such as ethyl acetate, the excess amine reactant can be washed out with water and the basic product then can be isolated as its soluble hydrochloride by extracting the organic layer twice with about one and one-half parts by weight of 1 N hydrochloric acid. The combined extracts can be then washed with ethyl acetate and, after separation, the aqueous layer can be rendered strongly basic (pH 12) by the addition of sodium hydroxide pellets. The liberated base can be extracted with methylene chloride, the extracts can be washed with an equal volume of water and, after separation, the organic layer can be dried over anhydrous magnesium sulfate and the free base can be obtained by evaporation of the solvent.

Those compounds of the instant invention which are substituted in the 9-position with a propylidene side chain are prepared conveniently by an alternative procedure. This method is outlined in the following sequence of reactions:

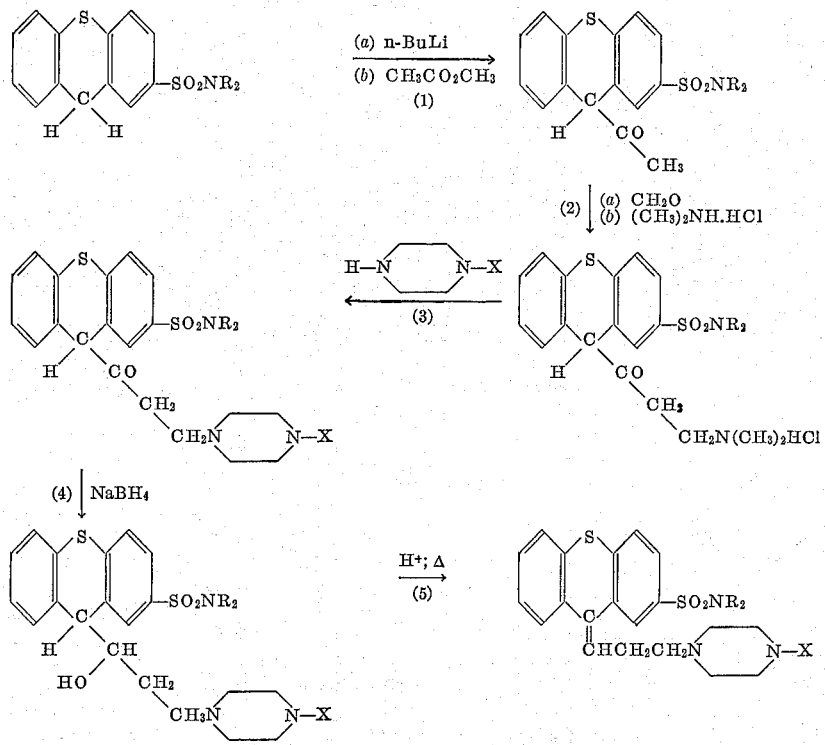

wherein X is as hereinbefore defined.

With respect to step (1), the conversion of 2-dimethylsulfamylthioxanthene to 9 - acetyl - 2 - dimethylsulfamylthioxanthene, the procedure can be carried out in a stepwise manner involving, first, treatment with n-butyl lithium and then with methyl acetate. The 2-dimethylsulfamylthioxanthene can be prepared by the procedure described hereinbefore and can be suspended in from about four to about 10 parts by weight of dimethoxyethane then can be treated at about 0° C., in a nitrogen atmosphere, with at least about an equivalent amount and, preferably, about a 20% excess of n-butyl lithium reagent. During the said treatment, the reaction temperature is preferably not allowed to rise above about 10° C. The reaction mixture can then be added to about one molar equivalent of methyl acetate, based on the dimethylsulfamylthioxanthene and is stirred at about 25° C. for about 3 hours. The reaction solvents can then be removed by distillation in vacuo and the desired product remains a residue.

As is exemplified in detail hereinafter, the product may be obtained in a more highly purified form by dissolving it in about 4 parts by weight of ethyl acetate and treating this with an equal weight of 10% ammonium chloride solution. The organic layer is separated, is washed with about ⅓ volume of water and the solvent is removed by distillation. The gummy residue is treated with about ½ its weight of Girard "T" reagent (see Teitelbaum, vol. 23, J. Org. Chem., 1958, p. 646) in the presence of a small amount of cation exchange resin and about twice its weight of ethanol. The mixture is refluxed for one hour, is cooled to 25° C. and is treated with about 2 parts by weight of water. The mixture is then filtered and the filtrate is stirred for about 16 hours with about 20 percent by weight of a 37% aqueous formaldehyde solution. The product which precipitates is especially suitable for the next step.

With respect to step (2), the conversion of 9-acetyl-2-dimethylsulfamylthioxanthene to 9 - (3 - dimethylaminopropanoyl) - 2 - dimethylsulfamylthioxanthene hydrochloride, the reaction can be carried out by treatment with formaldehyde and dimethylamine hydrochloride. For example, the 9-acetyl compound can be dissolved in about ten parts by weight of ethanol and then can be treated with at least about one mole, and preferably about 1.5 moles of formaldehyde, taken as a 37% aqueous solution. Then is added an amount of dimethylamine hydrochloride equivalent to the formaldehyde taken. The reaction mixture can be heated to about 40° C. for about 5 hours, then the solvents can be removed by distillation in vacuo. The product remains as a residue from distillation and can be purified by recrystallization from a solvent such as isopropanol.

With respect to step (3), the conversion of 9-(3-dimethylaminopropanoyl) - 2 - dimethylsulfamylthioxanthene to the corresponding 9-[3-(4-substituted-1-piperazinyl)propanoyl] - 2 - sulfamylthioxanthene, the reaction can be conveniently carried out by treatment with the appropriately substituted piperazine. The dimethylamino compound can be dissolved in about 5 parts by weight of a solvent such as methyl ethyl ketone and can be treated with at least about one molar equivalent, and preferably two molar equivalents, of substituted piperazine. The reaction mixture can be stirred and refluxed for 15 hours, then can be cooled and the solvent can be evaporated in vacuo. The residue from distillation can be dissolved in a solvent such as ethyl acetate, the excess piperazine can be removed by extraction with about 2 portions of about 5 volumes of water and then evaporation of the organic solvent leaves the free base as a residue.

With respect to step (4), the conversion of the 9-[3-(4-substituted - 1 - piperazinyl) - propanoyl] - 2 - dimethylsulfamylthioxanthene to the corresponding 9-[1-hydroxy-3 - (4 - substituted - 1 - piperazinyl) - propyl] - 2 - dimethylsulfamylthioxanthene, the reaction can be carried out by treatment with sodium borohydride. For example, the propanoyl compound can be dissolved in from about four to about 10 parts by weight of a solvent such as ethanol and is treated with a solution of sodium borohydride dissolved in about 20 parts by weight of ethanol. The mixture can be refluxed under nitrogen for about four hours and, after cooling to 25° C., can be extracted 4 times with equal volumes of ethyl acetate. The product can then be isolated by removal of the solvent by distillation; the product remains as a residue from distillation.

With respect to step (5), the conversion of the 9-[1-hydroxy - 3 - (4 - substituted - 1 - piperazinyl)propyl] - 2-dimethylsulfamylthioxanthene to the corresponding 9-[3-(4 - substituted - 1 - piperazinyl)propylidene] - 2 - dimethylsulfamylthioxanthen-9-one, the reaction can be carried out by a dehydration technique. For example, the reaction can be carried out by heating the intermediate in the presence of pyridine and phosphorous oxychloride. The hydroxypropyl compound can be dissolved in two parts by weight of pyridine and, after cooling to 0° C., the suspension can be treated with about 1.5 parts by weight of phosphorous oxychloride. The mixture can be allowed to warm to 25° C. during about 30 minutes then can be heated to about 90° C. for an additional 30 minutes. The product can be isolated by pouring the reaction mixture onto about 10 parts by weight of ice and, after rendering the mixture alkaline to pH 12 with sodium hydroxide pellets, the liberated base can be recovered by solvent extraction as is exemplified in detail hereinafter.

A convenient alternative route to the compounds of the instant invention which bear an unsaturated side chain at the 9-position and which bear an alkyl group on C–2 of the said side chain is outlined in the following scheme.

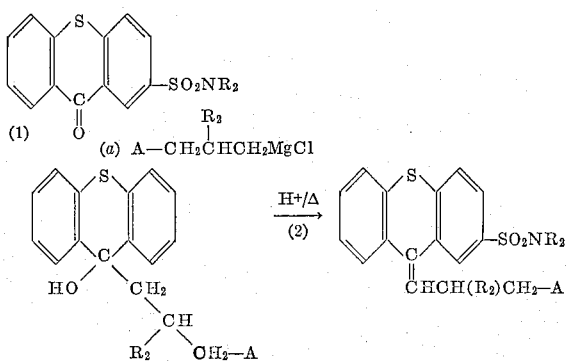

wherein $R_2$ is as hereinbefore defined and A is as hereinbefore defined, excluding, however, reagents containing hydroxyl and carbonyl groups, which cannot be converted to the Grignard compounds.

The thioxanthene-9-one starting material can be readily obtained by procedures familiar to those skilled in the art. For example, orthobromobenzoic acid can be successively treated with chlorosulfonic acid, with thionyl chloride in dimethylformamide, and finally with a secondary amine to form 2-bromo-4-dialkylsulfamylbenzoic acid. This intermediate may then be treated with thiophenyl anion in the presence of copper to form 3-dialkylsulfamyl-6-thiophenylbenzoic acid. This compound may then be treated with a dehydrating agent, such as sulfuric acid to form the corresponding 2-dialkylsulfamylthioxanthen-9-one.

With respect to step (1) of the above sequence, the conversion of the 2-dialkylsulfamylthioxanthen-9-one to the corresponding 9-(3-dialkylamino-3-alkylpropyl)-2-dialkylsulfamylthioxanthen-9-ol, the reaction can be carried out by a Grignard technique. Thus the Grignard reagent can be prepared by adding a solution of freshly distilled 3-amino-2-alkylpropyl halide in about 20 volumes of diethyl ether to an equimolar amount of magnesium turnings in the presence of a small crystal of iodine and a few drops of methyl iodide. The reaction is started by gently heating the reaction vessel to about 30° C. and the addition of the alkyl halide is maintained at such a rate that the reaction solvent refluxes from the heat of the exothermic reaction. After substantially all of the magnesium metal is consumed (this requires from about 2 to about 10 hours) a solution of the thioxanthene-9-one in about ten volumes of ether is added. It is preferred to employ an amount such that the mole ratio of Grignard reagent to thioxanthen-9-one is about 2.0 and to add the solution of the thioxanthen-9-one to the solution of the Grignard reagent maintained at the refluxing temperature; the time of said addition generally is of the order of about 1 to about 4 hours. After the addition is complete the reaction mixture is refluxed for an additional period of about 12 to about 48 hours whereupon it is cooled and treated with an equal volume of a 10% aqueous solution of ammonium chloride. The intermediate 9-(3-amino-2-alkylpropyl) - 2-dialkylsulfamylthioxanthen-9-ol can be isolated in the following manner. The etheral layer is separated, is washed with an equal volume of water, is dried with 10% aqueous solution sodium sulfite and the ether is evaporated. The solid residue can be further purified by recrystallization from ethanol or methanol or mixtures of ethanol and water.

With respect to step (2), dehydration of the 9-(3-dialkylamino-2-alkylpropyl)-2-dialkylsulfamylthioxanthen-9-ol to the corresponding 9-(3-dialkylamino-2-alkylpropylidene)-2-dialkylsulfamylthioxanthen-9-one, the conversion is carried out in the presence of heat and, preferably, in the presence of an acid catalyst. Thus, the 9-hydroxy compound can be treated with about 50 volumes of 2 N aqueous hydrochloric acid and the solution heated at about 100° C. for from about 3 to about 6 hours. The mixture can be cooled and rendered strongly basic (pH 12 or above) and the liberated base can be isolated by extraction into chloroform followed by separation of the organic layer and evaporation of the solvent therefrom.

Of course, as is obvious to those skilled in the art, there are a number of alternative processes suitable for the preparation of the compounds contemplated by the instant invention.

For example, a 2-dialkylsulfamylthioxanthene may be reacted with an ester of an amino alcohol according to the following sequence:

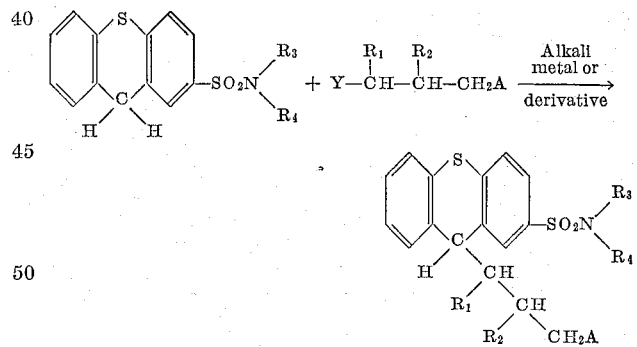

wherein Y represents the acid residue of a reactive ester such as a halogen atom, or a sulfonic ester residue and the other symbols, $R_1$, $R_2$, $R_3$, $R_4$ and A are as hereinbefore described. This reaction is conveniently carried out in the presence of a condensing agent such as an alkali metal or an alkali metal derivative, such as, for example, sodium hydride, sodium amide, n-butyl lithium, phenyl lithium, and the like.

Alternatively, the compounds of the instant invention may be obtained by decomposition of an appropriately substituted aminoalkylthioxanthene-9-carboxylate according to the following sequence:

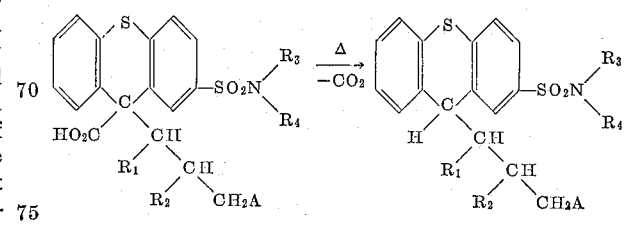

wherein the symbols are as defined hereinabove. This reaction may be accomplished by heating the ester to a temperature above about 100° C. While such reaction will occur without the aid of a diluent, it is preferred to carry the reaction out in an inert medium such as mineral oil since higher yields of material are obtained.

Alternatively, the compounds of the instant invention may be obtained by interaction of an appropriate amine (AH) with a reactive ester derivative of the general formula according to the following outlined scheme:

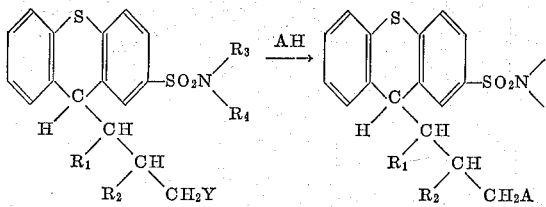

wherein the symbols are defined as hereinabove.

Of course, as is obvious, alkylation or acylation by known methods of the corresponding primary and secondary amines, i.e., those compounds of the instant invention in which A as defined hereinabove represents amino, monoalkylamino, or piperazinyl, will lead to compounds of the instant invention which bear alkyl or acyl groups attached to one of the nitrogen atoms.

Alternative methods for the preparation of the compounds of the instant invention which bear in the 9-position a propylidene group involve, for example, interaction of 2-dialkylsulfamylthioxanthene-9-one with an acid-sensitive ether of a halide according to the following reaction scheme:

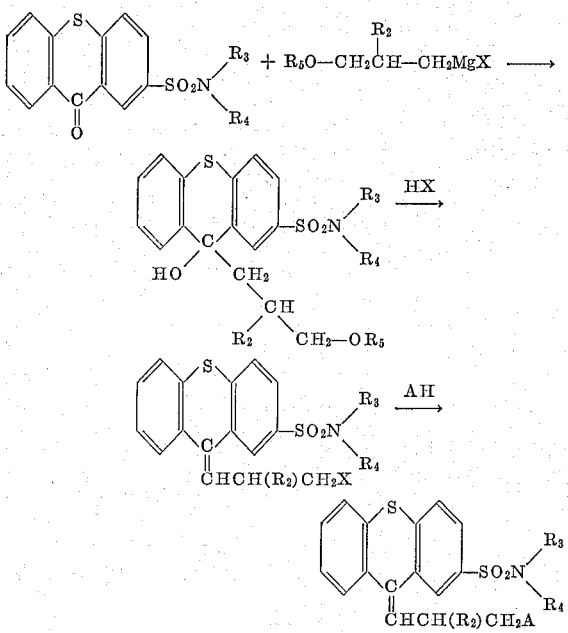

wherein $R_5$ represents a group such as 2-tetrahydropyranyl, isoamyl, benzyl, and the like, and the other symbols are defined as hereinabove.

Alternatively, the substituted thioxanthen-9-one may be reacted with allyl magnesium bromide, the intermediate formed thereby converted to the corresponding diene and the compound of the instant invention formed by treating the diene with the appropriate amine in accordance with the reaction scheme outlined as follows:

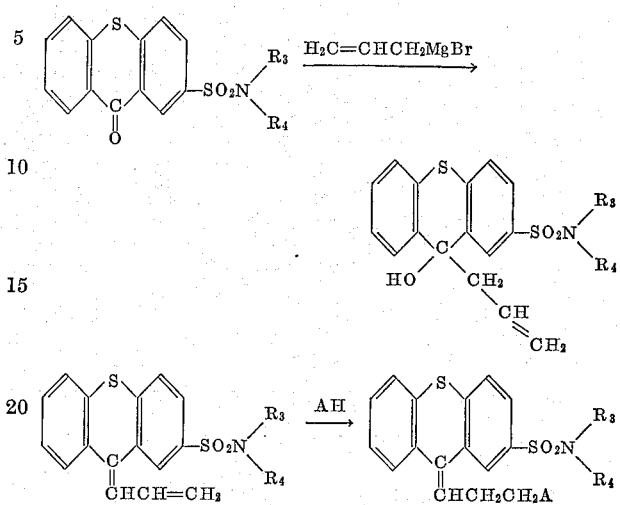

wherein the symbols are defined as hereinabove.

Alternatively, the 2-substituted thioxanthene-9-one may be reacted with an appropriately-substituted 3-dialkyl-aminopropyne-1-derivative and the intermediate formed thereby may be subsequently reduced and dehydrated in accordance with the scheme outlined as follows:

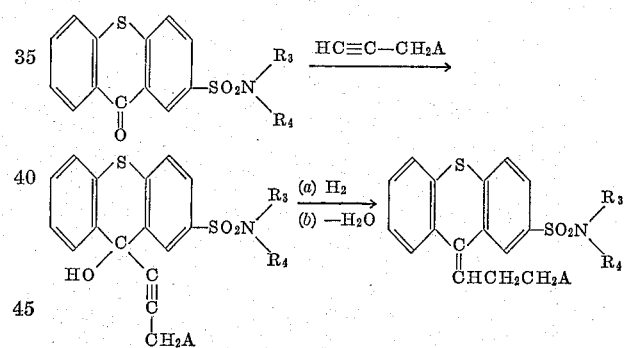

wherein the symbols are defined as hereinabove.

The acid addition salts of the compounds of the present invention can be formed by treating solutions of the free bases with the desired acid. It is particularly convenient to use chloroform and ethyl acetate solutions of the said bases and to employ aqueous solutions of the said acids.

The acids which can be used to prepare the acid addition salts are preferably those which produce when combined with the free base, salts whose anions are relatively inocuous to the animal organism in therapeutic doses of the salts, so that beneficial physiological properties inherent in the free base are not vitiated by side effects ascribable to the anions. However, when the products are the salts of toxic acids, they are readily converted to the free base by treatment with a strong base such as dilute sodium hydroxide.

Appropriate non-toxic addition salts are those derived from mineral acids such as hydrochloric acid, hydrobromic acid, hydriodic acid, nitric acid, phosphoric acid and sulfuric acid; and organic acids such as acetic acid, citric acid, tartaric acid, lactic acid, maleic acid, and the like, giving the hydrochloride, hydrobromide, hydroiodide, nitrate, phosphate or acid phosphate, sulfate or bisulfate, acetate, citrate or acid citrate, tartrte or bitartrate, and maleate salts, respectively.

The preferred new psychotherapeutic agents of the present invention possess high activity in the treatment of excited mental states. The physician will indicate daily dosage of said preferred compounds of this invention. The dosage will be dependent upon the extent of mental excitement, whether mild or severe. Tablets or capsules containing 10, 25, 50 and 150 milligrams of instant therapeutic agents are convenient unit dosage forms. Such tablets or capsules may be prepared from mixtures of the present compounds with well known pharmaceutical excipients, such as starch, sugar, tapioca, certain forms of clay and the like. Alternatively, liquid preparations may be prepared from mixtures of the present therapeutic agents and pharmaceutically-acceptable liquid media, such as water, aqueous glycols, sugar solutions, and the like which may contain conventional flavoring and coloring agents. Since the aforesaid pharmaceutically acceptable acid addition salts of the compounds of instant invention are relatively much more soluble than the free bases, advantage is taken of this in the isolation and/or purification of the above compounds and in the preparation of aqueous solutions of these new compounds for oral or parenteral administration.

The compounds of the instant invention are effective antiemetics, that is, they control the vomiting impulse. Especially effective in this respect are 9-[3-(4-methyl-1-piperazinyl)propyl]2-dimethylsulfamylthioxanthene, 9-[3-(4-dimethylsulfamyl-1-piperazinyl)-propyl]-2-dimethylsulfamylthioxanthene and 9-[3-(4-B-hydroxyethyl-1-piperazinyl)-propyl]-2-dimethylsulfamylthioxanthene which, in dogs, exhibit respectively the following $ED_{50}$: 0.01–0.05, 0.2 and 0.01–0.10, mg./kg., i.v. In contrast, a well known antiemetic, Chlorpromazine, exhibited an $ED_{50}$ of 0.7 mg./kg., i.v. $ED_{50}$ refers to a dose level effective to control the vomiting impulse in 50% of the subjects; mg./kg. means milligrams of compound administered per kilogram of weight of the subject; and i.v. means intravenous administration route.

It is, of course, to be understood that the instant invention contemplates compounds of the type capable of existing as cis and trans isomers. For example, the dialkylaminopropylidene-thioxanthenes can exist as isomers. While the isomeric mixtures exhibit therapeutic properties of the type possessed by these novel compounds, in some instances the activity may be greater in one pure isomer than in the other.

With reference to the cis and trans geometric isomers of 9 - [3 - (4 - methyl - 1 - piperazinyl)propylidene] - 2-dimethylsulfamylthioxanthene, there are found to be substantial differences in the pharmacological activity of these two materials. Thus, one of the two isomeric bases is much more effective than the other in antagonizing the stimulant effect of d-amphetamine and in its central nervous system activity, as measured by loss of avoidance behavior and other tests. Furthermore, this same isomer is distinctly more potent as an anti-emetic agent against apomorphine induced emesis when administered to dogs; that is, it controls the vomiting impulse.

Since it has not been possible up to this time rigorously to establish the absolute configurations of the isolated pure isomers, they will be described hereinafter and in the appended claims in terms of their physical constants.

Separation of the geometric isomers of 9-[3-(4-methyl-1-piperazinyl)propylidene]-2-dimethylsulfamylthioxanthene is accomplished by taking advantage of the solubility differences of the dioxalate salts in 50% aqueous ethanol. This technique which is well known in the art is carried out as follows: The mixture of bases is dissolved in hot 50% aqueous ethanol and is treated with two equivalents of oxalic acid dihydrate. Fractional crystallization of the mixed salts formed thereby leads to isolation first of a mixture of oxalates which is greatly enriched in one of the pure isomers. The pure isomer, as its dioxalate salt, is obtained after one recrystallization from 50% aqueous alcohol. Conversion of the oxalate to the free base yields the pure isomer, M.P., 123.6–124.6° C. The mother liquors from the fractional crystallization contain a mixture of oxalates which is enriched in the other pure isomer. This is isolated by evaporation of the solvent and is converted to the free base, and recrystallization of the base from diethyl ether affords the other pure isomer, M.P., 147.5–149° C. This latter isomer is found to be far superior to the former in tranquilizing and in anti-emetic potency.

The less active isomer is useful as an intermediate for the preparation of the more active isomer. Thus, the isomer, M.P., 123.6–124.6° C., is dissolved in about one hundred parts by weight of strong mineral acid, conveniently 2 N hydrochloric acid, and the mixture is heated at 100° C. for from about two to about ten hours. The solvent is evaporated and there remains an equilibrium mixture comprising about 60% of the lower melting isomer and 40% of the higher melting isomer. This mixture is separated into its pure components by fractional crystallization of the oxalate salts as described hereinbefore and the more active isomer is readily obtained.

Relationship of the following pharmacological data to the quantitative tranquillizing activity of the compounds of this invention is not clearly understood. However, the data are recognized in the art to be closely related to the effects observed on administration to subjects in mentally depressed or excited states. Thus, they are able to be used to clearly establish in which isomer the major part of the pharmacological activity resides.

A recognized test for central nervous system activity is to measure the presence or absence of an antagonizing effect on the stimulation induced by d-amphetamine. A modified Dews activity cage is used to measure spontaneous motor activity and antagonism of amphetamine-induced hyperactivity in grouped mice. Activity counts are graphed, and the $RD_{50}$, the dose, in mg./kg. i.p., which reduces motor activity and amphetamine-induced hyperactivity by 50%, is estimated.

It is found that the isomer of 9-[3-(4-methyl-1-piperazinyl)propylidene]-2-dimethylsulfamylthioxanthene which melts at 147.5–149° C. has an $RD_{50}$ of 1.3 for reduction in motor activity and an $RD_{50}$ of 0.3 in the amphetamine antagonism test. On the other hand, the isomer which melts at 123.6–124.6° C. has an $RD_{50}$ of 26.5 for reduction in motor activity and an $RD_{50}$ of 6.4 in the amphetamine antagonism test. Thus, the higher melting pure isomer is much more highly potent in suppressing motor activity and in antagonizing amphetamine-induced hyperactivity relative to the lower melting pure isomer.

Differences between the two isomeric forms are also found in measurements of their anti-emetic effect against apomorphine-induced emesis in dogs. Thus, measurements are made of the effective dose, in micrograms per kilogram, to provide this effect in 50% of the subjects, $ED_{50}$. The preparations are given intravenously one hour previous to 0.1 mg./kg. of intravenously-administered apomorphine. For the isomer of 9-[3-(4-methyl-1-piperazinyl)propylidene] - 2 - dimethylsulfamylthioxanthene which melts at 147.5–149° C., the $ED_{50}$ was 2.2 and for the isomer which melts at 123.6–124.6° C., the $ED_{50}$ was 65.0. Thus, the higher melting isomer is found to be far superior to the lower melting isomer in anti-emetic potency.

The following detailed procedures may be employed to prepare the starting materials for the compounds of the instant invention.

PREPARATION A

Sodium thioxanthene-2-sulfonate.—A solution of thioxanthene (32.2 g., 0.160 mole) in 160 ml. of chloroform was cooled to 0° and chlorosulfonic acid (12.4 ml., 0.190 mole) added as rapidly as possible while maintaining the internal temperature below 10°. After the addition was complete, the reaction mixture was allowed to approach room temperature during 30 minutes, then refluxed for an additional 20 minutes. The deep red solution was poured onto 100 g. of crushed ice and to convert the sulfonic acid to its sodium salt there was added 20 g. of sodium chloride. After filtering the slurry through a sintered glass funnel, the filter cake was washed with 50 ml. of chloroform and 50 ml. of 20% sodium chloride solution. The crude sodium sulfonate was digested in 1500 ml. of boiling water, and filtered at the boiling pont. Crystallization was allowed to proceed overnight at 4° and after filtration and vacuum drying at 100°, 33.3 g. (69%) of glistening, colorless plates were obtained.

PREPARATION B 2-dimethylsulfamylthioxanthene.—To a slurry of dry sodium thioxanthene-2-sulfonate (33.3 g., 0.111 mole) in 50 ml. of N,N-dimethylformamide was added thionyl chloride (14.3 g., 0.122 mole) in divided portions. An exothermic reaction ensued with complete dissolution being effected in minutes. Treatment of the reaction mixture with crushed ice precipitated a gum which crystallized after a short period of stirring. The sulfonyl chloride was filtered, washed with water, and stirred with 100 ml. of liquid dimethylamine. After allowing the mixture to evaporate to dryness, water was added and the sulfonamide filtered, washed with water, and dried in vacuo. The crude product (32.5 g., 96%) melting at 163.5–165°. One crystallization from ethanol chloroform yielded an analytical sample, M.P. 164.5–166.5°.

Analysis.—Calcd. for $C_{15}H_{15}NO_2S_2$: C, 58.99%; H, 4.96%; N, 4.59%. Found: C, 58.18%; H, 5.02%; N, 4.29%.

The procedure is repeated substituting for the dimethylamine an equimolar amount of ammonia or an appropriately substituted amine. The following substituted sulfamylthioxanthenes are obtained:

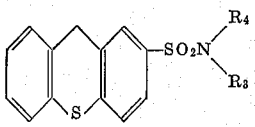

| $R_3$ | $R^4$ |
|---|---|
| H | H |
| H | $CH_3$ |
| H | $CH_2CH_2CH_3$ |
| H | $C(CH_3)_3$ |
| $CH_3$ | $CH_2CH_3$ |
| $CH_3$ | $CH(CH_3)_2$ |
| $CH_3$ | $CH_2CH_2CH_2CH_3$ |
| $CH_2CH_3$ | $CH_2CH_3$ |
| —$CH_2CH_2CH_2CH_2$— | |
| —$CH_2CH_2CH_2CH_2CH_2$— | |
| —$CH_2CH_2OCH_2CH_2$— | |
| —$CH_2CH_2N(CH_3)CH_2CH_2$— | |
| —$CH_2CH_2N(CH_2CH_2CH_3)CH_2CH_2$— | |

The following examples are given by way of illustration and are not to be construed as limitations of this invention, many variations of which are possible within the spirit and scope thereof.

Example I

9-[3-(4-methyl - 1 - piperazinyl) - propyl]-2-dimethylsulfamylthioxanthene.—2 - dimethylsulfamylthioxanthene, 6.11 g., 0.02 mole, prepared as described in Preparation B, is suspended in 40 ml. of dimethoxyethane and the mixture is stirred and cooled to 0° C. in a nitrogen atmosphere. A solution of butyl lithium, 3 M in heptane, 8.0 ml., 0.024 mole, is added at such a rate that the reaction temperature does not rise above 10° C. As soon as all of the alkyl lithium reagent has been added, the reaction mixture is transferred under nitrogen to a second vessel containing 1-chloro-3-bromopropane, 9.6 ml., 0.100 mole, at 25° C.; addition is made dropwise. The mixture is stirred at 25° C. for one hour, then is heated and refluxed for an additional 30 minutes. The solvents are removed by distillation in vacuo; during the distillation, two 20-ml. portions of dimethylformamide are added and distilled to insure complete removal of unreacted 1-chloro-3-bromopropane. The 9-(3-chloropropyl)-2-dimethylsulfamylthioxanthene, which remains as a yellow oil residue after distillation of the solvents, is then dissolved in 30 ml. of methyl ethyl ketone and 1-methylpiperazine, 4.01 g., 0.04 mole, is added. The resulting mixture is stirred and refluxed for 15 hours, then the solvent is removed by distillation in vacuo and the residual oil is dissolved in 25 ml. of ethyl acetate. The solution is washed twice with 50 ml. of water then the basic product is extracted with two 50-ml. portions of 1 N hydrochloric acid and the separated organic layer is washed twice with 50 ml. of water. The aqueous washings are combined with the acid extracts and are washed with two 25 ml. portions of ethyl acetate, the separated aqueous layer is made strongly alkaline (pH 12) with sodium hydroxide pellets, and the liberated product, which separates, is extracted with two 25 ml. portions of methylene chloride. The organic layer is washed with two 25 ml. portions of water, then is dried over anhydrous magnesium sulfate and the solvent is removed by distillation. There is obtained 7.58 g., 85% yield, of product as the free base. The free base is converted to its dimaleate salt by dissolving the base in 10 parts by weight of isopropanol, treating the solution with a solution of 2 molar equivalents of maleic acid in 10 parts by weight of isopropanol, removing by filtration the crystalline precipitate and recrystallizing the precipitate in methyl ethyl ketone. The dimaleate salt melts at 174–176° C.

Example II

The procedure of Example I is repeated substituting for the 1-methylpiperazine stoichiometrically-equivalent amounts of other appropriate 1-substituted piperazines. There are obtained the following 9-[3-(4-substituted-1-piperazinyl)-propyl]-2-dimethylsulfamylthioxanthenes:

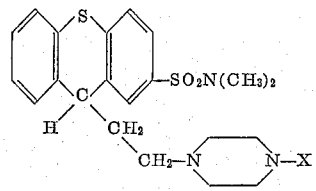

| X |
|---|
| $CH_2CH_2OH$ |
| $CH_2CH_2CH_2OH$ |
| $SO_2N(CH_3)_2$ |
| $SO_2CH_3$ |

The procedure of Example I is repeated substituting a stoichiometrically equivalent amount of the 2-diethylsulfamylthioxanthene of Preparation B for the corresponding 2-dimethylsulfamylthioxanthene. There is obtained 9-[3-(4-methylpiperazinyl)-propyl] - 2 - diethylsulfamylthioxanthene.

Example III

The procedure of Example I is repeated substituting a stoichiometrically equivalent amount of the appropriate thioxanthene from Preparation B for the corresponding 2-dimethylsulfamylthioxanthene and a stoichiometrically equivalent amount of an appropriate amine for the corresponding 1-methylpiperazine. In the case of the more volatile amines, such as dimethylamine and methylethylamine, a pressure reaction apparatus is employed. There are obtained the following 9-(3-alkylaminopropyl)-2-sulfamylthioxanthenes:

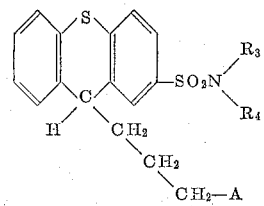

| R₃ | R₄ | A |
|---|---|---|
| CH₃ | CH₃ | —NCH₂CH₂N(CH₂CH₂CH₃)CH₂CH₂— |
| CH₃ | CH₃ | —NCH₂CH₂N(CH₂CH₂OCOCH₃)CH₂CH₂— |
| CH₃ | CH₃ | —NCH₂CH₂N(CH₂CH₂CONH₂)CH₂CH₂— |
| CH₃ | CH₃ | —NCH₂CH₂N(CH₂CH₂CONHCH₃)CH₂CH₂— |
| CH₃ | CH₃ | —NCH₂CH₂N(CH₂CH₂CON(CH₃)₂)CH₂CH₂— |
| CH₃ | CH₃ | —NCH₂CH₂N(CH₂CH₂OCH₂CH₃)CH₂CH₂— |
| CH₃ | CH₃ | —NCH₂CH₂N(CH₂CH₂OC₆H₅)CH₂CH₂— |
| CH₃ | CH₃ | —NCH₂CH₂N(CH₂CH₂OCH₂CH₂OH)CH₂CH₂— |
| CH₃ | CH₃ | —NCH₂CH₂N(CH₂CH₂COCH₃)CH₂CH₂— |
| CH₃ | CH₃ | —NCH₂CH₂N(CH₂CH₂COC₆H₅)CH₂CH₂— |
| CH₃ | CH₃ | —NCH₂CH₂N(CO₂CH₂CH₃)CH₂CH₂— |
| CH₃ | CH₃ | —NCH₂CH₂N(CONH₂)CH₂CH₂— |
| CH₃ | CH₃ | —NCH₂CH₂N(CONHCH₃)CH₂CH₂— |
| CH₃ | CH₃ | —NCH₂CH₂N[CONH(CH₃)₂]CH₂CH₂— |
| CH₃ | CH₃ | —NCH₂CH₂N(COCH₃)CH₂CH₂— |
| CH₃ | CH₃ | —NCH₂CH₂N(COC₆H₅)CH₂CH₂— |
| CH₃ | CH₃ | —NCH₂CH₂N(SO₂CH₂CH₂CH₃)CH₂CH₂— |
| CH | CH | —NCH₂CH₂N[SO₂N(CH₂CH₃)₂]CH₂CH₂— |
| —CH₂CH₂OCH₂CH₂— | | —NCH₂CH₂N(CH₂CH₂OCH₂CH₂OH)CH₂CH₂— |
| —CH₂CH₂CH₂CH₂CH₂— | | —NCH₂CH₂N(CH₂CH₂SO₂NH₂)CH₂CH₂— |

Thioxanthene is converted to 9-(3-chloropropyl)thioxanthene by the procedure of Example I. This is converted to sodium 9-(3-chloropropyl)-thioxanthene-2-sulfonate by the procedure of Preparation A. This intermediate is converted to 9-(3-chloropropyl)-2-sulfamyl-thioxanthene by the procedure of Preparation B.

By the same procedure, substituting stoichiometrically equivalent amounts of the appropriate amines for ammonia, there are obtained 9-(3-chloropropyl)-2-methylsulfamylthioxanthene and 9-(3-chloropropyl)-2-n-butylsulfamylthioxanthene.

The three sulfamylthioxanthenes bearing one or more hydrogen on the sulfamyl nitrogen are converted, by the procedure of Example I, substituting for the 1-methylpiperazine, stoichiometrically-equivalent amounts of appropriately substituted bases to 9-[3-(4-methyl-1-piperazinyl) - propyl] - 2 - sulfamylthioxanthene, 9-[[3-[4'-(beta - hydroxyethoxyethyl - 1 - piperazinyl]-propyl]]-2-methylsulfamylthioxanthene and 9-[[3-[4'-(beta-hydroxyethoxyethyl) - 1-piperazinyl]-propyl]]-2-n-butylsulfamylthioxanthene.

*Example IV*

9 - acetyl-2-dimethylsulfamylthioxanthene.—A suspension of 2-dimethylsulfamylthioxanthene, 12.22 g., 0.04 mole, made by the procedure of Preparation B, in 60 ml. of dimethoxymethane is cooled to 0° C. and 17.2 ml. of a 2.91 M solution of n-butyl lithium in heptane is added slowly in a nitrogen atmosphere while the temperature is maintained below 10° C. After an additional 10 minutes of stirring, the cooling bath is removed and a solution of 2.96 g. of methyl acetate in 20 ml. of dimethoxyethane is added during 1/2 hour and then the mixture is stirred at 25° C. for an additional 3 hours. The reaction mixture is then treated with 60 ml. of ethyl acetate and with 60 ml. of a 10% aqueous ammonium chloride solution. The layers are separated and the ethyl acetate layer is washed once with water (25 mls.) and then the solvent is removed by distillation. The product is purified by the method of Teitelbaum, J. Org. Chem., 23, 646 (1958): The gummy residue is treated with 7.8 g. of Girard "T" reagent, a commercially-available (carboxymethyl) trimethylammonium chloride hydrazide which can be prepared by the method described by Girard in Organic Syntheses, collective volume II, page 85 (1943), 0.2 g. of a methacrylic-carboxylic cation exchange resin of 20–50 mesh particle size, such as Amberlite IRC–50 produced by Rohm & Haas Co., Philadelphia, Pa., and 20 ml. of ethanol. The mixture is refluxed for one hour, then is cooled to 25° C., is diluted with 80 ml. of water and is filtered. The filtrate is stirred for 16 hours with 20 ml. of aqueous formaldehyde and the product precipitates as a white solid, M.P. 118–123°, net 5.6 g., yield, 40% of the theoretical.

The procedure is repeated substituting for the 2-dimethylsulfamylthioxanthene stoichiometrically-equivalent amounts of other appropriately-substituted sulfamylthioxanthenes of Preparation B. There are obtained the following 9-acetyl-2-substituted-sulfamylthioxanthenes:

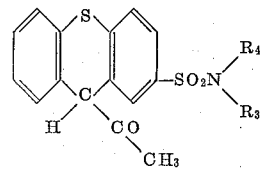

| R₃ | R⁴ |
|---|---|
| CH₃ | CH₂CH₃ |
| CH₃ | CH(CH₃)₂ |
| CH₃ | CH₂CH₂CH₂CH₃ |
| CH₂CH₃ | CH₂CH₃ |
| —CH₂CH₂CH₂CH₂— | |
| —CH₂CH₂CH₂CH₂CH₂— | |
| —CH₂CH₂OCH₂CH₂— | |
| —CH₂CH₂N(CH₃)CH₂CH₂— | |
| —CH₂CH₂N(CH₂CH₂CH₃)CH₂CH₂— | |

*Example V*

9 - (3 - dimethylaminopropionyl)-2-dimethylsulfamylthioxanethene.—To a mixture of 9-acetyl-2-dimethylsulfamylthioxanthene, 54.1 g., 0.155 mole, prepared as described in Example IV, isopropanol, 100 ml., paraformaldehyde, 10.6 g., 0.32 mole, and dimethylamine hydrochloride, 16.4 g., 0.200 mole, there is added 1.0 ml. of concentrated hydrochloric acid. The mixture is refluxed in a nitrogen atmosphere for 24 hours, then is concentrated to ½ volume by distillation of part of the solvent in vacuo. The concentrate is treated with 60 ml. of ethyl acetate then the mixture is cooled to 5° C. whereupon the crystalline product precipitates. This is removed by filtration and, after drying, weighs 47.8 g., and melts at 177–181° C. After two crystallizations from isopropanol the product is obtained as the monohydrochloride addition salt, M.P. 187–189° C.

The procedure is repeated substituting for the dimethylamine hydrochloride a stoichiometrically-equivalent amount of di-n-butylamine hydrochloride. There is obtained 9 - (3 - di - n-butylaminoproprionyl)-2-dimethylsulfamylthioxanthene.

The procedure is repeated substituting for the 9-acetyl-2 - dimethylthioxanthene stoichiometrically-equivalent amounts of the appropriately substituted 9-acetyl-2-substituted-sulfamylthioxanthenes of Example IV. There are obtained the following 9-(3-substituted-aminopropionyl)-2-substituted-sulfamylthioxanthenes as the hydrochloric acid solution addition salts:

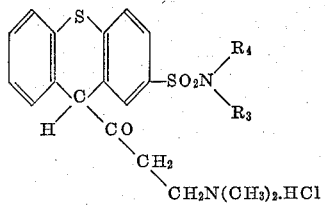

| R₃ | R₄ |
|---|---|
| CH₃ | CH₂CH₃ |
| CH₃ | CH(CH₂)₂ |
| CH₃ | CH₂CH₂CH₂CH₃ |
| CH₂CH₃ | CH₂CH₃ |
| —CH₂CH₂CH₂CH₂— | |
| —CH₂CH₂CH₂CH₂CH₂— | |
| —CH₂CH₂OCH₂CH₂— | |
| —CH₂CH₂N(CH₃)CH₂CH₂— | |
| —CH₂CH₂N(CH₂CH₂CH₃)CH₂CH₂— | |

*Example VI*

9 - [3 - (4 - methyl - 1 - piperazinyl) - 1 - hydroxypropyl]-2-dimethylsulfamylthioxanthene.—A mixture of 9-(3 - dimethylaminopropionyl) - 2 - dimethylsulfamylthioxanthene hydrochloride, 17 g., 0.039 mole, and 1-methylpiperazine, 20.0 g., 0.2 mole, in 40 ml. of isopropanol is refluxed in a nitrogen atmosphere for 3 hours. Ethyl acetate, 200 ml., is then added and the mixture is washed twice with 100 ml. of water, the organic layer is separated and dried with anhydrous sodium sulfate, then the solvent is removed by distillation in vacuo. The 9-[3-(4-methyl-1-piperazinyl)propionyl]-2-dimethylsulfamylthioxanthene which remains as a residue is treated with a solution of 3.03 g., 0.08 mole, of sodium borohydride in 100 ml. of ethanol. The mixture is refluxed under nitrogen for 3 hours, is cooled and is treated with an equal volume of water. The aminoalcohol is extracted 3 times with equal volumes of ethyl acetate. The organic layer is separated and is dried with anhydrous magnesium sulfate, then the solvent is removed by distillation leaving the product as a white, amorphous solid.

The procedure is repeated substituting stoichiometrically-equivalent amounts of appropriately substituted piperazines for 1-methylpiperazine. The following 9-[3-(4 - substituted - 1 - piperazinyl) - 1 - hydroxypropyl]-2-dimethylsulfamylthioxanthenes are obtained:

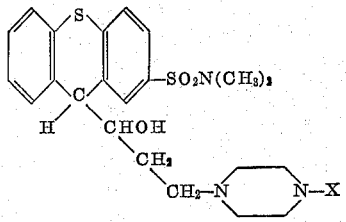

| X |
|---|
| CH₂CH₂OH |
| CH₂CH₂CH₂OH |
| SO₂N(CH₃)₂ |
| SO₂CH₃ |

The reaction is repeated substituting a stoichiometrically-equivalent amount of 9-(3-dimethylaminopropionyl)-2-diethylsulfamylthioxanthene for the corresponding 2-dimethylsulfamyl compound. There is obtained 9-[3-(4 - methylpiperazinyl) - 1 - hydroxypropyl] - 2 - diethylsulfamylthioxanthene.

*Example VII*

9 - [3 - (4 - methyl - 1 - piperazinyl) - propylidene] - 2-dimethylsulfamylthioxanthene.—A solution of 12 g. of 9 - [3 - (4 - methyl - 1 - piperazinyl) - 1 - hydroxypropyl]-2-dimethylsulfamylthioxanthene in 20 ml. of pyridine is cooled to 0° C. in an ice bath and 18.4 ml. of phosphorus oxychloride dissolved in 60 ml. of pyridine is added dropwise. The mixture is allowed to warm to 25° C. during 30 minutes, then is heated, immersed in an 80° C. oil bath, for an additional 30 minutes. The dark brown reaction mixture is cooled to 25° C. then is poured onto 50 g. of ice. After the ice has melted, the aqeous solution is saturated with potassium carbonate and the liberated oil is extracted with three 150 ml. portions of ethyl acetate. The solvents are removed from the separated organic layer by distillation. The product, a light brown amorphous solid, remains as a residue from the distillation. The free base is dissolved in 50 ml. of acetone, is treated with two stoichiometric equivalents of maleic acid in 50 ml. of acetone and the white crystalline dimaleate salt is removed by filtration. There is obtained 12.3 g., 47% yield, M.P. 158–160.5° C. (after recrystallization from ethanol).

The procedure is repeated substituting for the 2-dimethylsulfamylthioxanthene stoichiometrically - equivalent amounts of the other substituted thioxanthenes of Example VI. There are obtained:

9-[[3-[4-(2'-hydroxyethyl)-1-piperazinyl]-propylidene]] 2-dimethylsulfamylthioxanthene.

9-[[3-[4-(3'-hydroxypropyl)-1-piperazinyl]-propylidene]]-2-dimethylsulfamylthioxanthene.

9-[3-(4-dimethylsulfamyl-1-piperazinyl)-propylidene]-2-dimethylsulfamylthioxanthene.

9-[3-(4-methyl-1-piperazinyl)-propylidene]-2-diethylsulfamylthioxanthene.

*Example VIII*

The procedure of Example VII is repeated substituting for the 9-[3-(4-methyl-1-piperazinyl)-1-hydroxypropyl]-2-dimethylsulfamylthioxanthene stoichiometrically-equivalent amounts of appropriately-substituted piperazinylhydroxypropyl sulfamylthioxanthenes prepared by the procedure of Example VI from substituted piperazines and the dimethylaminopropionylsulfamylthioxanthene hydrochlorides of Example V. There are obtained the following piperazinyl-propylidene sulfamylthioxanthenes:

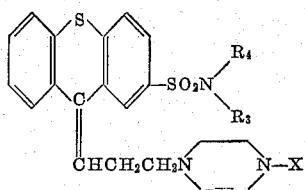

| R₃ | R₄ | X |
|---|---|---|
| CH₃ | CH₃ | CH₂CH₂CH₂CH₃ |
| CH₃ | CH₃ | CH₂CH₂CH₂CH₂OH |
| CH₃ | CH₃ | CH₂CH₂OCOCH₃ |
| CH₃ | CH₃ | CH₂CONH₂ |
| CH₃ | CH₃ | CH₂CH₂CONHCH₃ |
| CH₃ | CH₃ | CH₂CON(CH₃)₂ |
| CH₃ | CH₃ | CH₂CH₂OCH₃ |
| CH₃ | CH₃ | CH₂CH₂OC₆H₅ |
| CH₃ | CH₃ | CH₂CH₂OCH₂CH₂OH |
| CH₃ | CH₃ | CH₂CH₂COCH₃ |
| CH₃ | CH₃ | CH₂CH₂COC₆H₅ |
| CH₃ | CH₃ | CO₂CH₂CH₂CH₃ |
| CH₃ | CH₃ | CONH₂ |
| CH₃ | CH₃ | CONHCH₃ |
| CH₃ | CH₃ | CON(CH₃)₂ |
| CH₃ | CH₃ | COCH₃ |
| CH₃ | CH₃ | COC₆H₅ |
| CH₃ | CH₃ | SO₂CH₂CH₂CH₂CH₃ |
| CH₃ | CH₃ | SO₂N(CH₂CH₂CH₂CH₃)₂ |
| —CH₂CH₂N(CH₃)CH₂CH₂— | | CH₂CH₂CH₂OH |
| —CH₂CH₂OCH₂CH₂— | | CH₂CH₂OH |
| —CH₂CH₂N(CH₂CH₂CH₃)CH₂CH₂— | | SO₂N(CH₃)₂ |
| CH₂CH₃ | CH₂CH₃ | CH₂CON(CH₃)₂ |

Example IX

2 - dimethylsulfamylthioxanthene - 9 - one.—Chlorosulfonic acid, 160 ml., at 5° C. is treated with 100.5 g. (0.50 mole) of O-bromobenzoic acid. The mixture is heated in an oil bath at 100° C. for 2½ hours, is poured onto crushed ice, and the sulfonyl chloride intermediate, M.P. 151.5–154°, is isolated by filtration. The sulfonyl chloride is dissolved in 200 ml. of liquid dimethylamine, the solution is allowed to evaporate to dryness, and the residue is dissolved in water. The solution is carefully acidified with concentrated hydrochloric acid and the precipitated product is filtered. After one crystallization from water, the dried product weighs 90.0 g., 58% yield, M.P., 174–177°. Two recrystallizations from water raised the melting point to 176–177.5°.

A mixture of 2-bromo-5-dimethylsulfamylbenzoic acid, 123 g., 0.40 mole, potassium hydroxide pellets, 56.8 g., 0.85 mole, thiophenol 45 ml., 0.44 mole, isoamyl alcohol, 1000 ml., and copper powder (2.0 g.) is heated to boiling and the water which forms is collected in a Dean-Stark receiver.

The heavy mass is stirred under reflux for 18 hours, then the solvent is distilled in vacuo. The residue is treated with 600 ml. of water then the mixture is filtered through a bed of filter aid and the filtrate is carefully acidified with concentrated hydrochloric acid. The precipitated solid is removed by filtration and is crystallized from benzene. There is obtained 93.4 g. of 2-phenylthio-5-dimethylsulfamylbenzoic acid M.P. 215–217° C.

Concentrated sulfuric acid 200 ml., is heated to 70° and 2-phenylthio-5-dimethylsulfamylbenzoic acid, 33.7 g., 0.10 mole is added in one portion; the reaction temperature immediately rises to 80°. After 20–25 minutes, the mixture becomes yellow-orange and homogeneous, the reaction temperature drops to 70° C. and is maintained there for an additional thirty minutes. The solution is then cooled rapidly, is poured onto ice, and the product is extracted with chloroform, is washed with three 150-ml. portions of water, with 100 ml. of 5% sodium carbonate solution, twice with 100 ml. of water, then is dried over anhydrous magnesium sulfate, and the solvent removed by distillation to yield 21.4 g., 67% yield, of product melting at 175.5–177.5°.

The procedure is repeated substituting stoichiometrically-equivalent amounts of appropriately substituted amines for dimethylamine and using, where necessary to insure a homogeneous reaction system, an appropriate quantity of benzene. The following additional 2-substituted-sulfamylthioxanthen-9-ones are obtained:

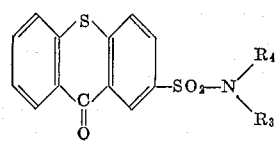

| R₃ | R⁴ |
|---|---|
| H | CH₃ |
| H | CH₂CH₂CH₃ |
| H | C(CH₃)₃ |
| CH₃ | CH₂CH₃ |
| CH₃ | CH(CH₃)₂ |
| CH₃ | CH₂CH₂CH₂CH₃ |
| CH₂CH₃ | CH₂CH₃ |
| —CH₂CH₂CH₂CH₂— | |
| —CH₂CH₂CH₂CH₂CH₂— | |
| —CH₂CH₂OCH₂CH₂— | |
| —CH₂CH₂N(CH₃)CH₂CH₂— | |
| —CH₂CH₂N(CH₂CH₂CH₃)CH₂CH₂— | |

Example X

Magnesium turnings, 1.44 g., 0.060 g.-atoms, are placed in a 3-necked flask provided with a condenser, stirrer and dropping funnel. An atmosphere of dry nitrogen is maintained in the apparatus throughout the reaction. The magnesium is covered with 5 ml. of dry tetrahydrofuran. A crystal of iodine and 0.2 ml. of ethyl bromide are added and after the reaction has subsided a solution of 8.14 g., 0.060 mole, of 2-methyl-3-dimethylaminopropyl chloride in 25 ml. of dry tetrahydrofuran is added dropwise over a period of 30 minutes. The mixture is stirred under reflux for an additional 30 minutes, then is cooled to room temperature. 2-dimethylsulfamylthioxanthen-9-one (9.58 g., 0.030 mole) is added in divided portions over a 90-minute period and the resulting reddish-brown slurry is stirred at room temperature for an additional twenty hours. Most of the solvent is removed under reduced pressure, the residue is treated with 150 ml. of 1 N ammonium chloride solution, and the precipitated white solid product is removed by filtration.

The reaction is repeated substituting for the 3-dimethylamino - 2 - methylpropyl chloride, a stoichiometrically-equivalent amount of 3-di-n-butylamino-2-i-propyl chloride; there is obtained 9-(3-di-n-butylamino-2-i-propyl)-2-dimethylsulfamylthioxanthen-9-ol.

The procedure is repeated substituting for 2-dimethylsulfamylthioxanthene-9-one the other 2-substituted sulfamylthioxanthene-9-ones of Example IX. There are obtained the following additional dimethylamino-2-methylpropyl-substituted thioxanthenes:

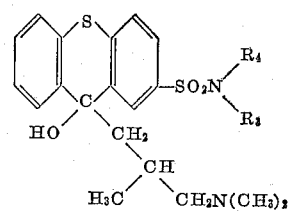

| R₃ | R₄ |
|---|---|
| CH₃ | CH₂CH₃ |
| CH₃ | CH(CH₃)₂ |
| CH₃ | CH₂CH₂CH₂CH₃ |
| CH₂CH₃ | CH₂CH₃ |
| —CH₂CH₂CH₂CH₂— | |
| —CH₂CH₂CH₂CH₂CH₂— | |
| —CH₂CH₂OCH₂CH₂— | |
| —CH₂CH₂N(CH₃)CH₂CH₂— | |
| —CH₂CH₂N(CH₂CH₂CH₃)CH₂CH₂— | |

Example XI

9 - (3-dimethylamino-2-methylpropylidene)-2-dimethylsulfamylthioxanthene.—9 - (3-dimethylamino-2-methylpropyl)-dimethylsulfamylthioxanthene-9-ol, 12 g., is dissolved in 300 ml. of 2 N hydrochloric acid, the mixture is filtered and the filtrate is refluxed under nitrogen for 4 hours. The reaction mixture is then cooled made basic to pH 12 by addition of 10 N aqueous sodium hydroxide solution and the liberated solid product is removed by filtration. The base is dissolved in 10 parts by weight of ether and the hydrochloride salt is precipitated therefrom by treatment with dry hydrogen chloride, 11.3 g., 82% yield, M.P. (with decomposition), 130° C.

Analysis.—Calcd. for $C_{21}H_{26}N_2O_2S_2 \cdot HCl \cdot H_2O$: C, 55.19; H, 6.40; N, 6.13. Found: C, 55.15; H, 6.16; N, 5.95.

By the same procedure, there is obtained 9-(3-di-n-metrically-equivalent amount of the corresponding thioxanthene-9-ols from Example X for the corresponding dimethylsulfamylthioxanthene-9-ol, there are obtained the following 9-(3-dialkylamino-2-alkylpropylidene)-2-alkyl-sulfamylthioxanthene:

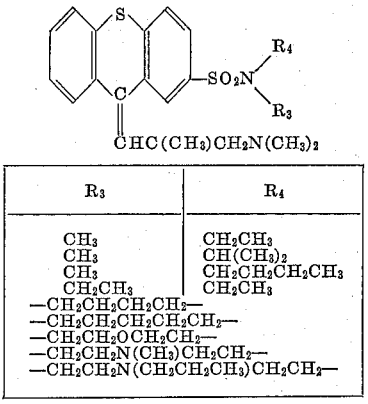

| $R_3$ | $R_4$ |
|---|---|
| $CH_3$ | $CH_2CH_3$ |
| $CH_3$ | $CH(CH_3)_2$ |
| $CH_3$ | $CH_2CH_2CH_2CH_3$ |
| $CH_2CH_3$ | $CH_2CH_3$ |
| —$CH_2CH_2CH_2CH_2$— | |
| —$CH_2CH_2CH_2CH_2CH_2$— | |
| —$CH_2CH_2OCH_2CH_2$— | |
| —$CH_2CH_2N(CH_3)CH_2CH_2$— | |
| —$CH_2CH_2N(CH_2CH_2CH_3)CH_2CH_2$— | |

By the same procedure, there is obtained 9-(3-di-N-butylamino-2-i-propyl propylidene)-2-dimethylsulfamyl-thioxanthene-9-one from the corresponding thioxanthene-9-ol of Example X.

*Example XII*

The hydrochloric acid addition salt of 9-(3-dimethylaminopropylidene) - 2 - dimethylsulfamylthioxanthene-9-one is prepared by mixing an acetone solution of the free base with an aqueous solution containing a stoichiometrically equivalent of hydrochloric acid and evaporating the resulting solution.

Other acid addition salts of the new sulfamylthioxanthene compounds of the present invention described in the above examples are prepared by this same procedure employing acetic acid, hydrobromic acid, hydriodic acid, nitric acid, citric acid, phosphoric acid, tartaric acid, sulfuric acid, lactic acid and maleic acid.

*Example XIII*

Separation of isomeric 9-[3-(4-methyl-1-piperazinyl) propylidene] - 2 - dimethylsulfamylthioxanthene.—The crystalline free base comprising a cis/trans mixture prepared by the procedure of Example VII, 4.44 g., 0.010 mole, M.P., 114–118° C., is dissolved in 50 ml. of hot 50% aqueous ethanol and there is added thereto a solution of oxalic acid dihydrate, 2.5 g., 0.020 mole, in 50 ml. of the same solvent. Crystallization is allowed to proceed at 25° C. for 20 hours. The crystalline dioxalate salt, which forms, is removed by filtration and is recrystallized from 50% aqueous ethanol to yield the pure isomer dioxalate salt, M.P. 229° C., with decomposition. This is reconverted to the free base by treatment with aqueous potassium carbonate, is extracted with dichloromethane and, after evaporation of the organic layer, is recrystallized from diethyl ether. There is obtained 2.36 g., 53% yield of the pure isomer, M.P. 123.6–124.6° C.

The mother liquor from the fractional crystallization contains the other isomer, is concentrated in vacuo to near dryness, the residue is treated with aqueous potassium carbonate and the suspension is extracted with dichloromethane. The dichloromethane is removed by distillation and the residue is recrystallized three times from diethyl ether and there is obtained the other pure isomer, 0.90 g., 20% yield, M.P. 147.5–149° C. At one stage, a lower melting modification, M.P. 135.5–137.5° C. was obtained, and this was readily converted to the higher melting form by seeding an ether solution with said higher melting form. The said higher melting form and its lower melting modification possess the hereinabove described enhanced pharmacological activity.

*Example XIV*

Isomerization of the isomer of 9-[3-(4-methyl-1-piperazinyl)propylidene] - 2 - dimethylsulfamylthioxanthene, M.P., 123.6–124.6° C.—This isomer, isolated by the procedure of Example XIII, 50 mg., is heated in 5 ml. of 2 N hydrochloric acid on a steam bath for four hours. The mixture is evaporated to dryness and the residue which comprises a mixture of the isomeric cis/trans hydrochlorides is separated by the fractional crystallization technique of Example XIII into the dioxalate of the form melting at 123.6–124.6° and the dioxalate of the form melting at 147.5–149° C. This latter isomer is converted to the free base with an aqueous potassium carbonate as is described in Example XIII, which compound has the hereinbefore described enhanced pharmacological activity.

What is claimed is:
1. A compound of the formula

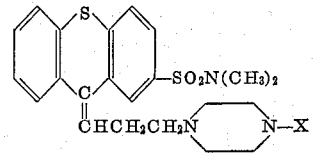

wherein X is selected from the group consisting of methyl, 2-hydroxyethyl, 3-hydroxypropyl, dimethylsulfonamido and methylsulfonyl.

2. 9 - [3 - (4 - methyl - 1 - piperazinyl) - propylidene]-2-dimethylsulfamylthioxanthene.

3. The pure, isomer-free, base of the compound of claim 2 melting at about 123.6–124.6° C.

4. The pure, isomer-free, base of the compound of claim 2 melting at about 147.5–149° C.

5. 9-[[3 - [4 - (2 - hydroxyethyl) - 1 - piperazinyl]propylidene]]-2-dimethylsulfamylthioxanthene.

References Cited by the Examiner
UNITED STATES PATENTS

| | | | |
|---|---|---|---|
| 2,898,336 | 8/1959 | Gailliot et al. | 260—243 |
| 2,894,947 | 7/1959 | Jacob et al. | 260—243 |
| 2,940,969 | 6/1960 | Bonvicino et al. | 260—240 |
| 3,047,580 | 7/1962 | Sprague | 260—328 |
| 3,113,137 | 12/1963 | Schaeren et al. | 260—327 |
| 3,115,502 | 12/1963 | Schlapfer et al. | 260—328 |
| 3,192,204 | 6/1965 | Craig et al. | 260—240 |

OTHER REFERENCES

Petersen et al.: Arzn. Forsch, vol. 8, pages 395 to 397 (1958).

Schenker-Herbst: Drug Research, vol. 5, pages 426 to 437, Birkhauser Verlag Basel and Stuttgart, Basel, Switzerland (1963).

Villani et al.: J. Med. and Pharm. Chem., vol. 5, pages 373–374 (March 1962).

JOHN D. RANDOLPH, *Primary Examiner.*

WALTER A. MODANCE, *Examiner.*